M. P. ENYEART.
TROLLEY HARP.
APPLICATION FILED AUG. 11, 1921.
1,419,365.
Patented June 13, 1922.
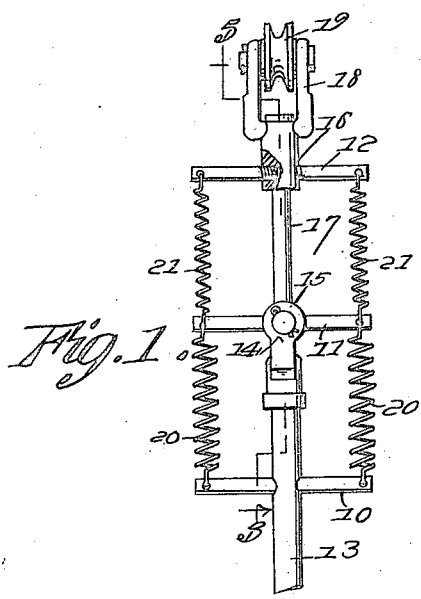
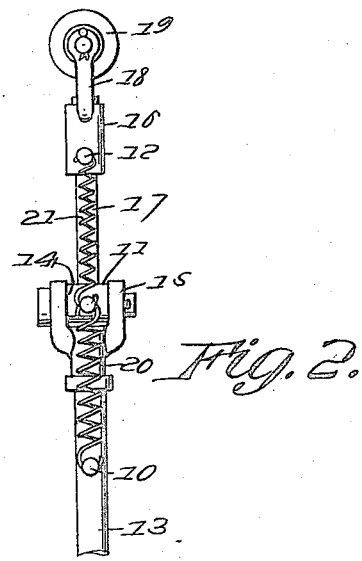
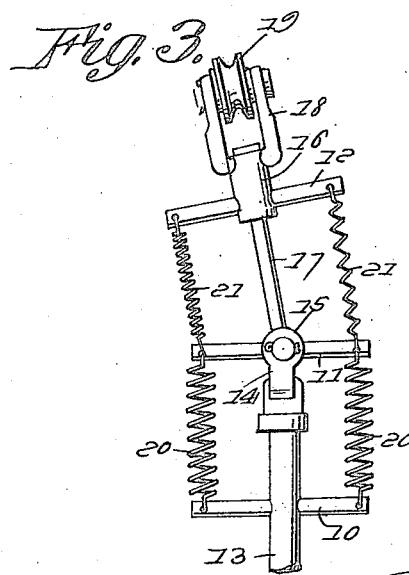
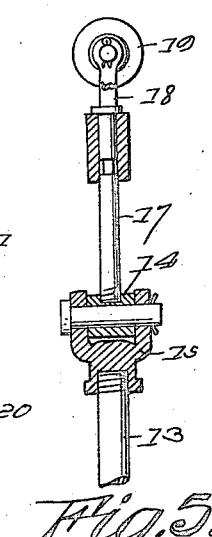
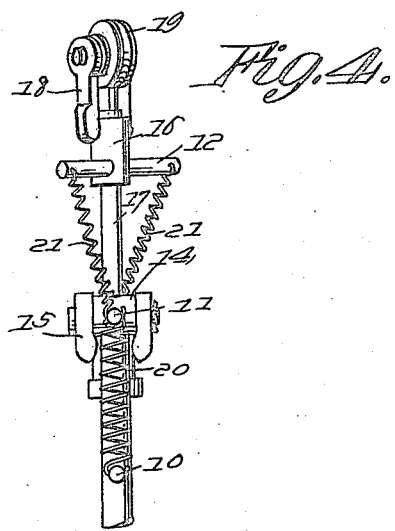
Inventor
Martin P. Enyeart,
By
Attorney

UNITED STATES PATENT OFFICE.

MARTIN P. ENYEART, OF GIRARD, OHIO.

TROLLEY HARP.

1,419,365.

Specification of Letters Patent. Patented June 13, 1922.

Application filed August 11, 1921. Serial No. 491,544.

*To all whom it may concern:*

Be it known that MARTIN P. ENYEART, a citizen of the United States of America, residing at Girard, in the county of Trumbull and State of Ohio, has invented new and useful Improvements in Trolley Harps, of which the following is a specification.

The object of the invention is to provide a trolley harp of simple and comparatively inexpensive construction whereby the trolley wheel is adapted to follow the wire in the deflections thereof from a direct course parallel with the path of the car or vehicle, as on curves and the like, and to compensate for turning and rocking movements of the car or trolley pole with relation to the line of the trolley wire to avoid the dismounting or disengagment of the trolley wheel from the wire, and hence the inconveniences and delays incident to such displacement; and furthermore to provide a harp adapting the trolley wheel to follow the wire notwithstanding angular deflections of the latter or of the car or rocking movements of the latter without imposing any appreciable or injurious strain upon either the trolley wheel or the wire, or the pole by which the wheel is carried; and to this end the invention consists in a construction and combination of parts of which a preferred embodiment is shown in the accompanying drawings, wherein:—

Figure 1 is an elevation of a trolley harp and wheel embodying the invention.

Figure 2 is an edge view of the same.

Figure 3 is a view similar to Figure 1 with the trolley wheel laterally deflected or displaced.

Figure 4 is an edge view showing the trolley wheel angularly deflected from its normal course.

Figure 5 is a sectional view taken longitudinally of the harp on the plane indicated by the line 5—5 of Figure 1.

The harp consists essentially of a plurality of cross arms 10, 11 and 12 of which the first-named is carried by and is rigid with the pole 13, the second or intermediate cross arm is carried by a rocker 14 which is mounted for lateral swinging movement in a fork 15 at the upper end of the trolley pole, and the upper or last-named cross head is carried by the trolley head 16 supported by the rocker but having a swivelled connection therewith through the agency of a spindle or stem 17, said trolley head being provided with a fork 18 in which is mounted the trolley wheel 19 which may be of any desired construction and which is designed to operate in the ordinary way.

The extremities of the lower cross arm are connected with those of the intermediate cross arm by springs 20 to yieldingly maintain parallelism of said arms, and the extremities of the intermediate and upper cross arms are connected by coiled springs 21 to yieldingly maintain parallelism thereof and resist turning movement of the upper cross arm with relation to the intermediate cross arm and return the former to its normal position after deflection.

This construction provides as will be obvious for a lateral rocking movement of the trolley head as shown in Figure 3 with a sufficient resistance to the movement to insure the promopt return of the intermediate cross arm to its normal position as the position of the trolley wire permits the trolley wheel to resume its normal position, while the swivelled mounting of the trolley head carrying the upper cross arm permits the trolley wheel to follow angular deflections of the trolley wire subject to the yielding resistance offered by the springs connecting the intermediate and upper cross arms, so that a combination of the several elements affords a universal movement of the trolley wheel to accurately follow deflections in any direction of the trolley wire and thereby avoid the lateral strains upon the wheel which are the usual cause of the disengagement or dismounting thereof.

Having described the invention, what is claimed as new and useful is:—

1. A trolley harp having lower, intermediate and upper cross arms terminally connected in series by coiled springs for yieldingly maintaining the substantial parallelism thereof, the lower cross arm being rigid with the pole, the intermediate cross arm being mounted for rocking movement in the plane of the pole and the upper cross arm having a swivel mounting with its axis of movement in alignment with the pole, and the trolley wheel being mounted in a head movable with the upper cross arm.

2. A trolley harp having lower, intermediate and upper cross arms terminally connected in series by coiled springs for yieldingly maintaining the substantial parallelism thereof, the lower cross arm being rigid with a trolley pole, the intermediate cross arm being mounted for rocking movement in the plane of the pole, and a trolley head carrying the trolley wheel and the upper cross arm and having a swivelled connection with the rocker for rotary movement in axial alignment with the pole.

3. A trolley harp having a lower cross arm supported in rigid relation with the trolley pole, an intermediate cross arm having a rocker mounted for pivotal movement in the plane of the pole, a stem or spindle being carried by said rocker in normal alignment with the pole, a trolley wheel having a head mounted for swivel movement upon said stem or spindle and provided with an upper cross arm, and coiled springs connecting the terminals of said cross arms in series to yieldingly maintain the substantial parallelism thereof.

In testimony whereof he affixes his signature.

MARTIN P. ENYEART.